Figure 2:
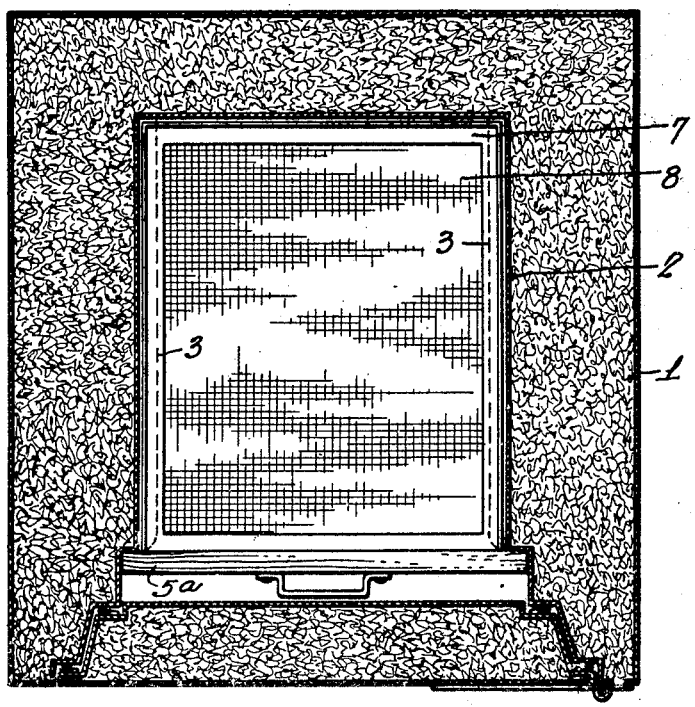

Aug. 23, 1932.  H. M. TAYLOR  1,873,364

REFRIGERATING APPARATUS AND METHOD

Filed Aug. 21, 1929

INVENTOR
Henry M. Taylor
BY
George C. Bleau
ATTORNEY

Patented Aug. 23, 1932

1,873,364

UNITED STATES PATENT OFFICE

HENRY M. TAYLOR, OF CLEVELAND, OHIO, ASSIGNOR TO DRYICE EQUIPMENT CORPORATION, OF NEW YORK, N. Y., A CORPORATION OF DELAWARE

REFRIGERATING APPARATUS AND METHOD

Application filed August 21, 1929. Serial No. 387,279.

My present invention is shown as embodied in a compact unit designed for the hardening of ice cream in molds, but my invention and various features thereof may be used in other connections and for other purposes.

An important object of the invention is to arrange matters so as to produce a maximum freezing effect with a view to cooling various products to a desired temperature in a short time, and particularly to cool a large number of molded ice cream units far below freezing in a few minutes.

For such purposes I employ a gaseous medium that is substantially free from moisture and hence has a phenomenal drying effect on the articles, during the cooling or freezing operation, namely, carbon dioxide gas freshly evaporated from frozen carbon dioxide. In fact, the construction and functioning of the apparatus closely follows the lines of an efficient dryer, in so much as cooling and drying by contact of a circulatory gaseous medium, at a very low temperature, is quite analogous to the arrangements employed for hot air drying of fruits and the like.

For my purposes, I employ an insulating refrigerator shell, which may be of conventional construction, and arrange therein superposed layers of ice cream molds alternating with layers of solid carbon dioxide, said layers being disposed in alternating trays or drawers and having reticulated or wire mesh bottoms affording the freest possible circulation. The drawers containing the molded ice cream or other materials to be refrigerated are interposed between other trays, usually shallower trays which are filled with solid carbon dioxide preferably in crushed or fragmental form. The mold containing trays are preferably as shallow as permitted by the size of the molds to be chilled therein, but the frozen carbon dioxide trays need be no deeper than is necessary to contain a layer of the solid carbon dioxide fragments. In this way, the alternating layers, though in intimate proximity, are nevertheless separate from one another and the mold drawers can be removed without disturbing the drawers containing the solid carbon dioxide. The drawers are freely slidable in and out of place on angle iron slides provided for the purpose, and the front end of each drawer is made full size to fit and snugly close the front opening through which it is removed. As a certain amount of refrigerant gas is always lost when a drawer or tray is pulled out, it is desirable to have the drawers and their front end closures as shallow as practicable and the longer they are as compared with their width or height, the larger the amount of material that can be removed through a given opening.

Figure 1:
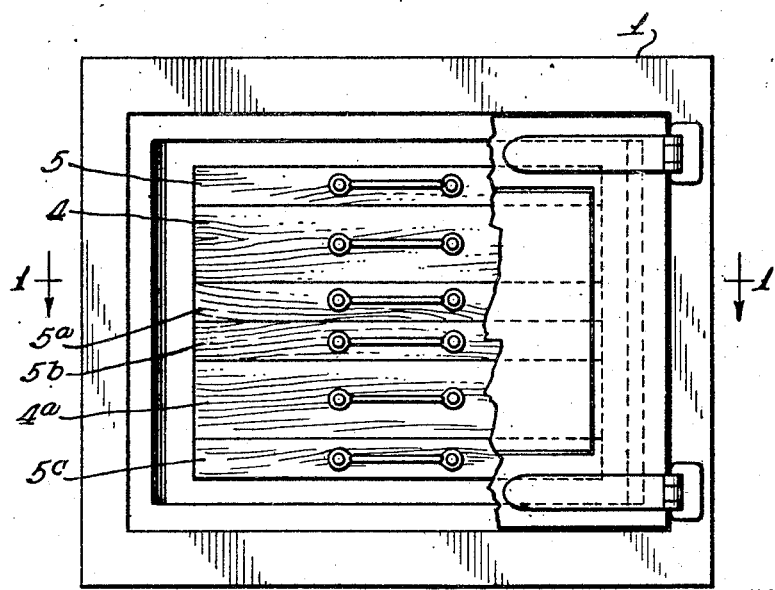

The above and other features of my invention may be more fully understood from the following description in connection with the accompanying drawing, in which Fig. 1 is a front elevation of a conventional cabinet with the door open; and Fig. 2 is a horizontal section on the line 2—2, Fig. 1.

The cabinet 1 is in the form of a box of conventional refrigerator construction, except that the insulating walls are thicker because of the extremely low interior temperatures which are to be maintained within the cabinet. The interior lining, 2, may be wood or metal and secured to the outward walls thereof are the angle iron slides 3, spaced suitable distances to accommodate the trays 4 and 4a for the molds or other products to be cooled and dried and also the shallower trays 5, 5a, 5b, and 5c, for the frozen carbon dioxide.

As will be evident from Fig. 1, the front ends of the drawers completely fill the front opening of the refrigerator chamber, when all the drawers are in place and, as shown in Fig. 2, the bottoms of the drawers comprise frame members 7 to which are soldered the open wire mesh bottom members 8.

The shallower drawers 5, 5a, 5b, etc., are charged with a substantial layer of frozen carbon dioxide fragments and after being allowed to stand a sufficient time to fully refrigerate the interior, the apparatus is ready for use. Thereupon the mold drawers 4, 4a, may be drawn out or removed and charged with a layer of molds containing the ice cream to be hardened, or any other product to be cooled or dried. These drawers are then closed and allowed to remain so the length of time shown by experience to be desirable for producing the required low temperature.

The frozen carbon dioxide sublimates, producing anhydrous gaseous carbon dioxide which is given off at a very low temperature, 110° or more below zero F. The cold gas flows downward freely through the reticulated bottom directly to the adjacent layer of molds below it. Thereafter, the natural thermo circulation causes a quick and uniform distribution of the refrigerant medium throughout the products to be cooled and dried thereby and both the refrigerant and products are in intimate proximity so that a desired cooling and drying effect will be produced in a minimum time.

I prefer to have two refrigerant trays in the middle of each section as shown, because it puts a double quantity of the refrigerant between the two mold containing trays which are of course the main source from which heat is to be absorbed and two trays of standard thickness are preferable to one deep tray because, as the frozen carbon dioxide sublimates and lies closer to the bottom of the tray, a second high level support for the upper half of the frozen carbon dioxide will hold it as close as possible to the bottom of the mold tray above it. Another advantage is that tray 5b and tray 4a may both be removed and a single tray of a depth equal to their combined depth may be substituted, thus permitting the user to insert molds as high as the combined depths of the two drawers 5b, 4a. For instance, a tray, 4a, may be designed for molds say 3 inches high and, if the tray above it is 2 inches high, the above procedure will permit the insertion of molds 5 inches high.

By my above described invention, ice cream molds may be chilled down to a desired temperature far below the freezing point of water in 6 or 8 minutes, where it would require 20 or 30 minutes or more to produce the same effect in an ordinary refrigerator, even though frozen carbon dioxide be employed as the refrigerant in both cases.

As applied to the ice cream industry, it allows the mold worker to fill molds and do the hardening thereof in close proximity, saving walking long distances to the hardening room, saving time and avoiding obstructions of traffic in aisles or behind counters. With the aid of my apparatus, the molds can be made, chilled and packed in frozen carbon dioxide packages within the space of a few feet. It also avoids the great losses of refrigerant medium which result where the hardening is done in relatively large refrigerator rooms requiring frequent opening and closing of relatively large doors which permit the heavy cold air to flow out and warm air to flow in so as to practically lose most of the refrigerant medium in the room. In ordinary operation, such doors might be opened from 50 to 100 times in the ordinary work of packing, hardening and dispensing a thousand molds. In my apparatus, the drawer which will be opened is relatively small, the refrigerant space is deep, and the only gas that can be lost is above the level of the drawer which is opened.

In view of the fact that relatively small fragments of the frozen carbon dioxide can be used and in fact are preferred, the scrap pieces left over from packing for shipment, etc., can be used to great advantage.

Finally, the hardening operation is so speedy that a very small unit such as above described will be sufficient for carrying on the business of a relatively large concern, the molds being put up, hardened and shipped as needed so that there is no danger of being left at the end of a day or week with an over-stocked or over-crowded hardening room.

I claim:—

1. A refrigerating cabinet of the class described, having therein spaced-apart, reticulated means each supporting a layer of fragmental frozen carbon dioxide and means for supporting between the same, in intimate heat exchange relation therewith, a thin layer of products to be refrigerated.

2. A refrigerator casing of insulating construction and having a side opening door, the space within the refrigerator being divided horizontally into separate spaces by slidable, reticulated trays each having outer end closures for the space between it and the next above said trays including upper and lower trays supporting frozen carbon dioxide separated by trays supporting products to be hard frozen.

3. A refrigerator casing of insulating construction and having a side opening door, the space within the refrigerator being completely occupied by horizontal, reticulated trays each having outer end closures for the space between it and the next above, at least one of said spaces being of approximately the height required for the article to be cooled therein and having others above and below the same each bearing a layer of fragmental frozen carbon dioxide.

4. A refrigerator casing of insulating construction and having a side opening door, the space within the refrigerator being completely occupied by horizontal, reticulated trays each having outer end closures for the space between it and the next above, at least one of said spaces being of approximately the height required for the article to be cooled therein and having others above and below the same each bearing a layer of fragmental frozen carbon dioxide, and the latter spaces being of substantially less vertical height.

5. A refrigerator casing of insulating construction and having a side opening door, the space within the refrigerator being completely occupied by horizontal, reticulated trays each having outer end closures for the space between it and the next above, at least one of said spaces being of approximately the height required for the article to be cooled therein and having others above and below the same each bearing a layer of fragmental frozen carbon dioxide; and the latter spaces being of substantially less vertical height, and all said trays being very wide as compared with their height.

6. A refrigerator casing of insulating construction and having a side opening door, the space within the refrigerator being completely occupied by horizontal, reticulated trays each having outer end closures for the space between it and the next above, at least one of said spaces being of approximately the height required for the article to be cooled therein and having others above and below the same each bearing a layer of fragmental frozen carbon dioxide, and the latter spaces being of substantially less vertical height, and all said trays being very wide as compared with their height and of substantially greater length than width.

7. The method of hardening molded edibles, which includes disposing the molds in thin layers and disposing them between and in free gas circulatory relation to subjacent and superposed layers of fragmental frozen carbon dioxide for a time sufficient to permit hardening and freezing to a point far below the freezing point of water, and removing said layer of molds without disturbing the layers of frozen carbon dioxide.

Signed at Cleveland, in the county of Cuyahoga, and State of Ohio, this 15th day of August, A. D. 1929.

HENRY M. TAYLOR.